(12) United States Patent
Adams

(10) Patent No.: US 11,614,754 B2
(45) Date of Patent: Mar. 28, 2023

(54) MULTIROTOR VERTICAL TAKEOFF AND LANDING AIRCRAFT WITH CYCLOROTOR FOR LATERAL CONTROL

(71) Applicant: Pitch Aeronautics LLC, Boise, ID (US)

(72) Inventor: Zachary Howard Adams, Boise, ID (US)

(73) Assignee: Pitch Aeronautics LLC, Boise, ID (US)

( * ) Notice: Subject to any disclaimer, the term of this patent is extended or adjusted under 35 U.S.C. 154(b) by 267 days.

(21) Appl. No.: 16/990,721

(22) Filed: Aug. 11, 2020

(65) Prior Publication Data

US 2022/0050476 A1 Feb. 17, 2022

(51) Int. Cl.
| | | |
|---|---|---|
| G05D 1/10 | (2006.01) | |
| B64C 39/02 | (2023.01) | |
| B64D 27/24 | (2006.01) | |
| B64D 47/08 | (2006.01) | |
| G05D 1/00 | (2006.01) | |
| G05D 1/08 | (2006.01) | |
| B64C 27/82 | (2006.01) | |
| B64U 30/20 | (2023.01) | |
| B64U 50/19 | (2023.01) | |

(52) U.S. Cl.
CPC ............ *G05D 1/102* (2013.01); *B64C 27/82* (2013.01); *B64C 39/024* (2013.01); *B64D 27/24* (2013.01); *B64D 47/08* (2013.01); *G05D 1/0094* (2013.01); *G05D 1/0858* (2013.01); *B64U 30/20* (2023.01); *B64U 50/19* (2023.01); *B64U 2201/104* (2023.01)

(58) Field of Classification Search
None
See application file for complete search history.

(56) References Cited

U.S. PATENT DOCUMENTS

| | | | |
|---|---|---|---|
| 9,346,535 B1 * | 5/2016 | Adams | B64C 39/005 |
| 9,527,597 B1 * | 12/2016 | Sada | B64D 27/08 |
| 10,661,897 B2 | 5/2020 | Cobb | |
| 2015/0292481 A1 * | 10/2015 | Whinney | F03D 7/06 |
| | | | 416/111 |
| 2017/0248967 A1 * | 8/2017 | Krogh | G01S 17/88 |
| 2018/0016004 A1 * | 1/2018 | Cobb | B64C 1/30 |
| 2018/0196435 A1 * | 7/2018 | Kunzi | G05D 1/0088 |
| 2018/0237136 A1 * | 8/2018 | Choi | B64C 3/32 |

(Continued)

FOREIGN PATENT DOCUMENTS

| | | | |
|---|---|---|---|
| CN | 202481313 U | * | 10/2012 |
| WO | WO-2020065304 A1 | * | 4/2020 |

*Primary Examiner* — Jelani A Smith
*Assistant Examiner* — Davin Seol
(74) *Attorney, Agent, or Firm* — Stanley J. Gradisar Attorney At Law, LLC; Stanley J. Gradisar

(57) ABSTRACT

A vertical takeoff and landing aircraft capable of six degree-of-freedom motion where lift, pitch, and roll are provided by multirotors oriented vertically, lateral translation is provided by a cyclorotor oriented vertically, and yaw is provided by a combination of the cyclorotor and the multirotors. The invention includes a frame, which supports the multirotors and cyclorotors. The frame also supports a payload and battery which are positioned at the extreme ends of the frame. The aircraft is capable of hovering precisely to position a payload close to or touching a target surface in the air.

20 Claims, 5 Drawing Sheets

(56) References Cited

U.S. PATENT DOCUMENTS

| | | | |
|---|---|---|---|
| 2019/0137628 A1* | 5/2019 | Lukoschat | B64D 47/08 |
| 2019/0185169 A1* | 6/2019 | Xu | B64C 39/024 |
| 2019/0337616 A1* | 11/2019 | Benedict | B64C 39/005 |
| 2022/0089279 A1* | 3/2022 | Rosen | B64C 39/024 |

* cited by examiner

MULTIROTOR VERTICAL TAKEOFF AND LANDING AIRCRAFT WITH CYCLOROTOR FOR LATERAL CONTROL

BACKGROUND

Multirotor unmanned aerial vehicles (UAVs), otherwise known as drones, provide an inexpensive vertical-takeoff-and-landing (VTOL) platform for a variety of payloads. These drones use several (3-10+) fixed-pitch propellers directly mounted to motors. An onboard microcontroller synthesizes pilot and onboard sensor readings, then commands the rotational speed of the individual multi-rotor motors to vary the drone pitch, roll, and yaw attitudes and total aircraft lift. Drones are commonly used for recreational flying and video, but are beginning to be coupled with more advanced sensors. Integrating LIDAR, multi-spectral cameras, time-of-flight sensors/cameras, and other remote sensors enables drones to perform valuable inspections by flying in the vicinity of a target.

Multirotor drones could accomplish many more tasks if they could hold an exact position despite atmospheric perturbations. In particular, this would allow them to perform up-close and touch-based tasks on hard-to-access places. However, the precision of multirotor drones is limited by their method of lateral motion. The lateral motion is underactuated, in that these drones have no direct way of sideways or forward-aft motion. Instead they must change their pitch or roll attitude to initiate such motion. FIG. 1 describes the sequence of multirotor drone 12 sideways motion in sub-figures 7, 8, and 9. To begin moving forward or sideways from a hover 7, multirotor drone 12 must first alter the rotational speed of their rotors 13 (shown in changing pitch attitude 8), which in turn produces differential rotors thrust 10. This differential rotor thrust 10 causes a net pitching moment 11 which then alters the pitch/roll attitude. With a non-zero pitch/roll attitude 9, a component of the differential rotors thrust 10 is oriented in the direction of desired motion and the drone begins accelerating that direction. This process takes some time to accomplish since the aircraft must first overcome its rotational inertia before it can produce a lateral force. Underactuated motion limits hovering precision in a dynamic atmosphere, where the aircraft must continuously accommodate for small perturbations in position. Multirotor drones cannot pitch and roll quickly enough to maintain exactly the same lateral position.

The present invention overcomes this deficiency through integration of a cyclorotor. Cyclorotors are fluid propulsion and control devices that convert mechanical rotation into vectorable thrust by fluid acceleration. They incorporate blades 5 whose span is parallel to the cyclorotor axis of rotation, as shown in FIG. 2. As the cyclorotor 1 rotates in rotation direction 3, the blades 5 are oscillated once per revolution so that the individual blade aerodynamic lift 6 produces a net thrust 2 in a unified direction. Altering the function of blade motion changes the thrust direction and magnitude anywhere in the plane perpendicular to the cyclorotor axis of rotation and can compensate for changes in the freestream flow 4 (FIG. 2). The thrust vector can be altered quickly since there is negligible inertia associated with this change. This contrasts traditional propulsion systems (helicopter rotors, propellers, jet engines, etc.) that can only produce thrust along their axis of rotation.

Cyclorotors are useful for propulsion, control and aerodynamic lift in aerial and marine applications that require rapid thrust direction control. They are commercially found on tugboats and ferries which leverage this capability for precise docking. Other practical advantages of the cyclorotor include low aerodynamic noise, simple transition between operation in a stationary and moving fluid, efficient thrust production at low Reynolds numbers, and ease of mounting on a planar surface. Researched applications leveraging these characteristics include airship propulsion and control, micro air vehicles, highly maneuver-able unmanned aerial vehicles (UAVs), and manned high-speed vertical take-off and landing aircraft.

SUMMARY

This invention integrates a cyclorotor onto a multirotor drone. The cyclorotor provides a means for precise lateral control. This invention provides an aircraft which can hover precisely and position a payload close to or touching a target surface of an object or structure accessible through the air. The invention integrates rotors for lift, pitch, and roll control with a single cyclorotor for lateral control. Lateral control in this case is defined by motion perpendicular to the gravity vector. Yaw control is provided by a combination of the cyclorotor and rotors control. Implementing a cyclorotor for lateral control enables precise and rapid compensation for atmospheric perturbations without needing to pitch or roll the aircraft. The frame of the aircraft is designed so that the payload can be positioned far from the center of the aircraft so that it can interact with a target surface of interest.

Figure 1:
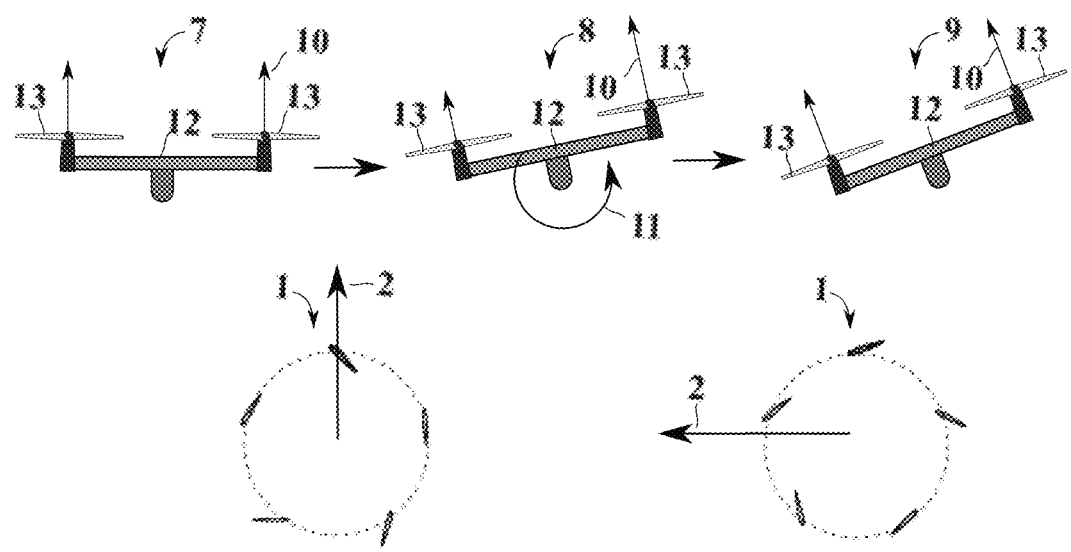
FIG. 1 shows a that multirotor drone thrust vectoring requires reorienting the aircraft, whereas cyclorotors vector thrust by altering the blade pitching motion as known in the prior art.
Figure 2:
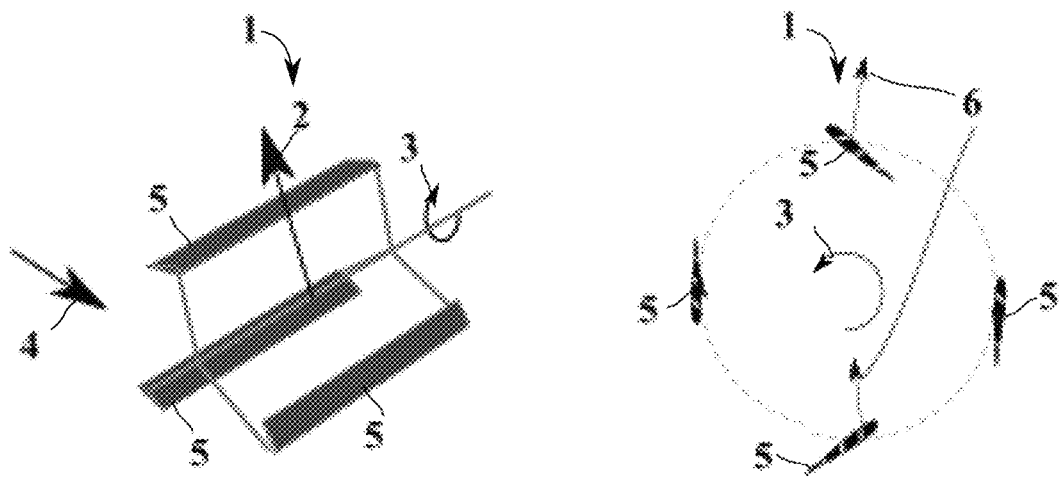
FIG. 2 shows a generic cyclorotor and its means of producing thrust as known in the prior art.

To assist in the understanding of the present disclosure the following list of components and associated numbering found in the drawings is provided herein:

| Component | Number |
| --- | --- |
| Cyclorotor | 1 |
| Net thrust | 2 |
| Rotation direction | 3 |
| Freestream flow | 4 |
| Blades | 5 |
| Blade aerodynamic lift | 6 |
| Hover | 7 |
| Changing pitch attitude | 8 |
| Non-zero pitch/roll attitude | 9 |
| Differential rotors thrust | 10 |
| Net pitching moment | 11 |
| Multirotor drone | 12 |

-continued

| Component | Number |
| --- | --- |
| Rotors | 13 |
| Hybrid multirotor-cyclorotor drone | 14 |
| Longitudinal axis | 15 |
| Lateral axis | 16 |
| Directional axis | 17 |
| Roll rotation | 18 |
| Pitch rotation | 19 |
| Yaw rotation | 20 |
| Lateral support members | 21 |
| Motors | 22 |
| Longitudinal member | 23 |
| Landing gear legs | 24 |
| Battery | 25 |
| Payload | 26 |
| Sensor package | 27 |
| Translate right | 28 |
| Translate left | 29 |
| Beams | 30 |
| Image region | 31 |
| Target surface | 32 |
| Ground | 33 |
| Stationary point | 34 |
| Hover | 35 |
| Laterally perturbed | 36 |
| Pitched | 37 |
| Restore pitch | 38 |
| Return hover state | 39 |
| Center of gravity | 40 |
| Embodiment | 41 |
| Embodiment | 42 |
| Embodiment | 43 |
| Embodiment | 44 |
| Embodiment | 45 |
| Embodiment | 46 |
| Tail rotor | 47 |
| Microcontroller | 48 |
| Multirotor | 49 |

DETAILED DESCRIPTION

Figure 3:
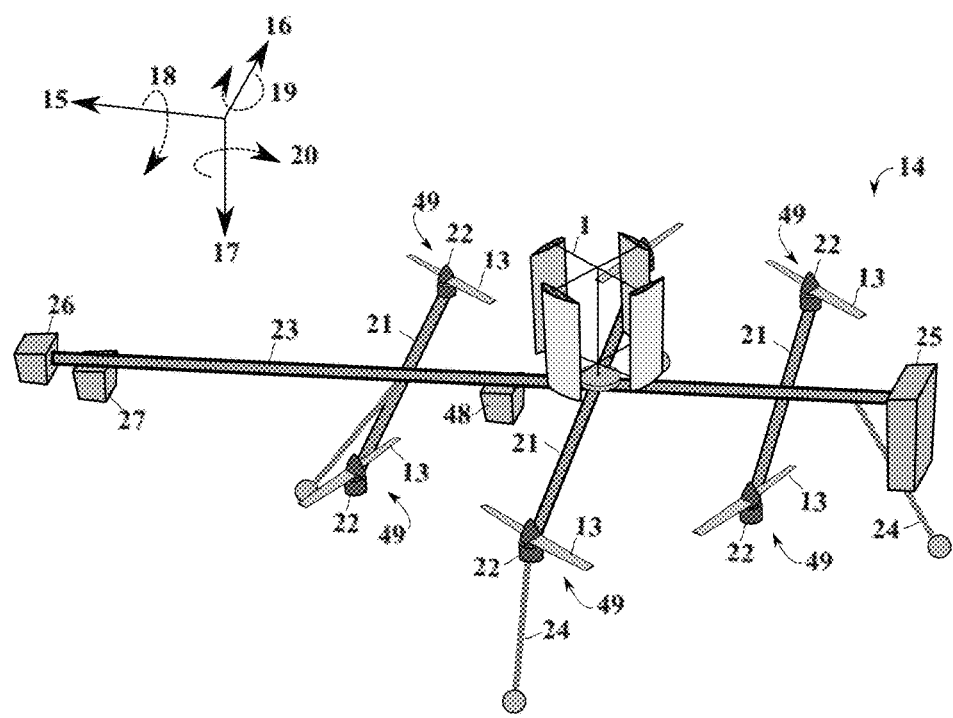
FIG. 3 shows an isometric drawing of an embodiment of the invention known as a hybrid multirotor-cyclorotor drone.

Referring to FIG. 3, the components of this invention are supported on a frame having a longitudinal member 23 and lateral support members 21. The payload 26 is mounted on one end of the longitudinal member 23 and the battery 25 is mounted on the other end. Lateral support members 21 extend outward from both sides of the longitudinal member 23 in a perpendicular fashion, but could also be oriented at an angle from the perpendicular as a design choice. The motors 22 are mounted at the outer ends of the lateral support members 21. Each motor 22 has rotors 13 that rotate at an orientation at or near vertical with respect to the longitudinal member 23 and the lateral support members 21. Each paired motor 22 and rotors 13 are referred to as a multirotor 49. A cyclorotor 1 is mounted above the longitudinal member 23 between the payload 26 and the battery 25 near the center of the hybrid multirotor-cyclorotor drone 14. The cyclorotor 1 is also oriented at or near vertical with respect to the longitudinal member 23 and the lateral support members 21. In some embodiments the cyclorotor 1 is placed dead center above the center of gravity, though placement of the cyclorotor 1 between the payload 26 and the battery 25 may vary significantly and the hybrid multirotor-cyclorotor drone 14 would still be operable. However, programming of the flight controls is easier if the cyclorotor 1 is placed dead center above the center of gravity. The position of the payload 26 and battery 25 are such that their combined center of gravity is laterally and longitudinally coincident with the center of gravity of the rest of the aircraft. Based on the weight of the payload 26 and the battery 25 and the other components of the hybrid multirotor-cyclorotor drone 14, the combined center of gravity may be at or near the center of the hybrid multirotor-cyclorotor drone 14. Landing gear legs 24 extend from the bottom of the longitudinal member 23 and lateral support members 21 to support the hybrid multirotor-cyclorotor drone 14 while on the ground.

The payload 26 is positioned on the longitudinal member 23 far from the rotors to allow it to be flown in close proximity to or actually in contact with another object in space. Examples of such a payload could include touch-based non-destructive testing sensors, such as ultrasound, or tools such as a drill or robotic arm. Other sensors and tools for the payload include, but are not limited to: active thermography sensor, ground penetrating radar, Schmitt hammer, thermal camera, optical camera, microscope, paint spray-gun, nail gun, vacuum, pressure washer, welder, and rotary or chain saw. One skilled in the art will recognize that many other tools and sensors could be used for the payload. The payload 26 weight is offset by battery 25 positioned on the opposite side of the hybrid multirotor-cyclorotor drone 14. A sensor package 27 may be included anywhere with the necessary field of view. This configuration both provides the means for a payload to touch another object and allows the payload an unobstructed field of view.

Figure 4:
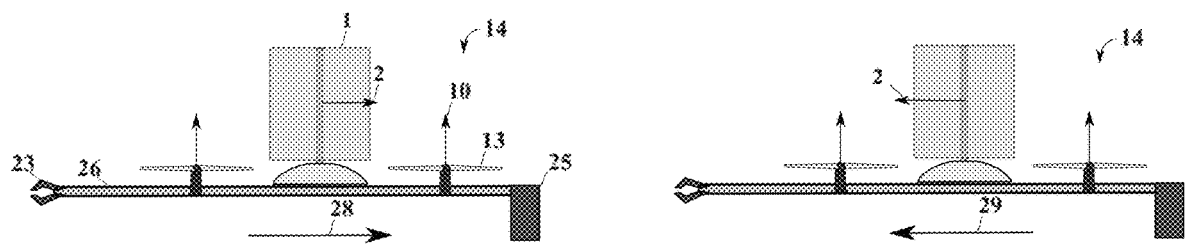
FIG. 4 shows the means by which a hybrid multirotor-cyclorotor drone translates.

The multirotors 49 and cyclorotor 1 are positioned to provide six degree-of-freedom (DOF) motion. The multirotors 49 provide a lifting force opposing gravity along the directional axis 17. Increasing the rotational speed of all of the rotors 13 simultaneously will cause the hybrid multirotor-cyclorotor drone 14 to climb. The cyclorotor 1 can produce a net thrust 2 (See FIGS. 1 and 4) anywhere in the plane defined by the longitudinal axis 15 and lateral axis 16. Referring to FIG. 4, increasing the net thrust 2 in a particular longitudinal or lateral direction will cause the hybrid multirotor-cyclorotor drone 14 to translate in that direction. In FIG. 4, increasing net thrust 2 to the right will cause the hybrid multirotor-cyclorotor drone 14 to translate right 28 and increasing the net thrust 2 to the left will result in a translate left 29 motion.

Referring again to FIG. 3, differential thrust between the multirotors 49 can produce rotation about the longitudinal axis 15, lateral axis 16, and directional axis 17, or roll rotation 18, pitch rotation 19, and yaw rotation 20 respectively. This mode of rotational motion is the same as present multirotors and known to those skilled in the art. Net thrust 2 is coupled to each of these rotational motions. Forward thrust will induce a nose-down pitch rotation 19 about the lateral axis 16. Rightward cyclorotor thrust will produce a roll rotation 18 about the longitudinal axis 15. Producing net thrust 2 in any direction will cause a yaw rotation 20 on the hybrid multirotor-cyclorotor drone 14 in the direction opposite that of rotation direction 3 about the directional axis 17. These induced moments must be simultaneously countered by altering the rotational speed of the rotors 13 to maintain a level aircraft attitude. This causes the hybrid multirotor-cyclorotor drone 14 an inspection of a target surface to remain level to perform an inspection.

Since the net thrust 2 can provide direct lateral and longitudinal control, the hybrid multirotor-cyclorotor drone 14 has no need to pitch or roll. Thus, the differential rotors thrust 10 and net thrust 2 can be altered to maintain a level platform. The hybrid multirotor-cyclorotor drone 14 can then be translated and yawed in order to complete its mission. Under some circumstances, such as cruising forward flight, the hybrid multirotor-cyclorotor drone 14 could be pitched or rolled to provide additional force in that direction.

Figure 5:
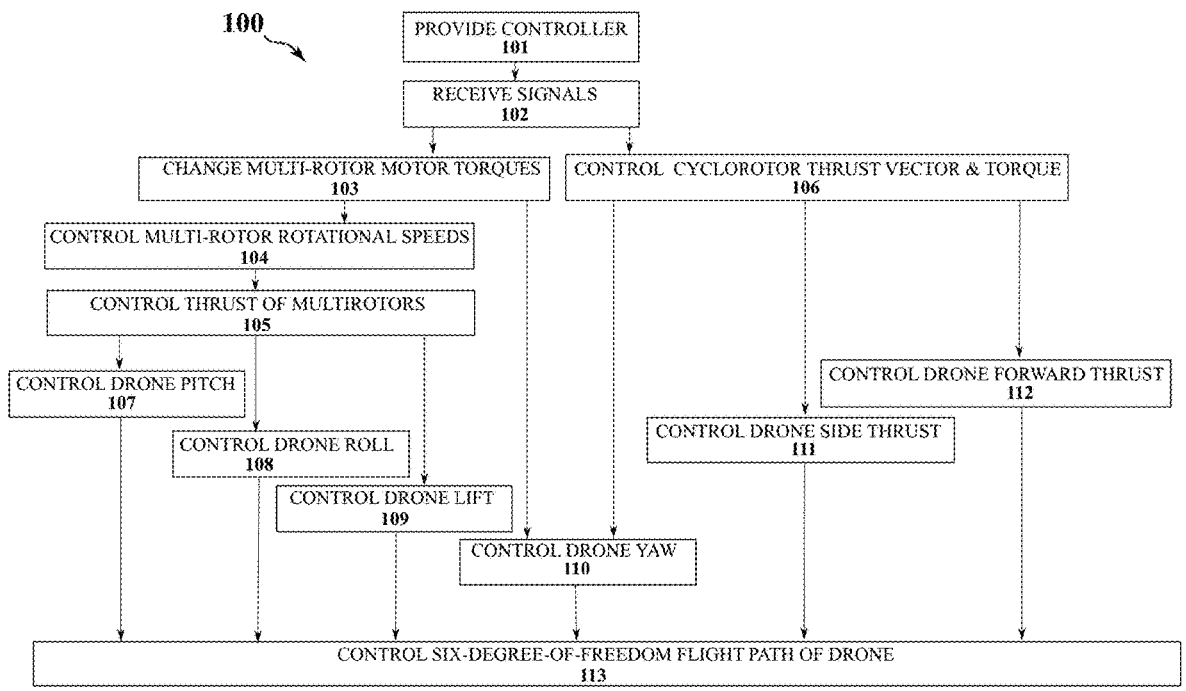
FIG. 5 is a flow chart of a method for controlling the flight path of the hybrid multirotor-cyclorotor drone in one embodiment of the invention.

FIG. 5 shows a flowchart of the method of control of the hybrid cyclorotor-multirotor drone 14. Understand that the process blocks displaying the steps in the method 100 may be accomplished separately, or simultaneously. As an example, both the torque of the multirotors 103 and the cyclorotor thrust 106 are altered in tandem to control drone yaw.

Figure 6:
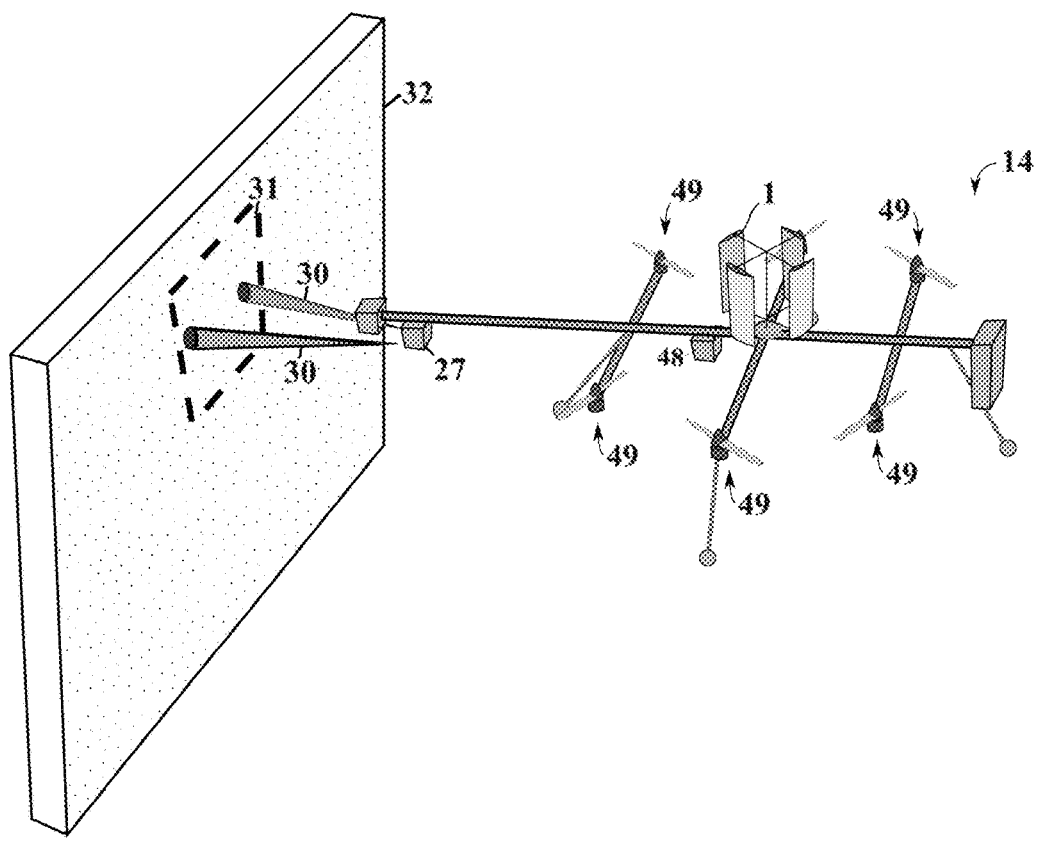
FIG. 6 shows the interaction between sensors on the hybrid multirotor-cyclorotor drone and a target surface.

The method 100 may provide a microcontroller 101 possessing a processor and memory. This microcontroller 101 may read signals 102 received from numerous sensors which could include a current state of the rotors, a current state of the cyclorotor(s), distance measuring sensors, a global positioning system receiver, optical flow cameras, gyroscopes, accelerometers, a horizontally oriented range finding sensor, a pilot, an autopilot, thermometers, and barometric altimeters. In order to fly precisely next to a structure or target surface 32, the method could employ the sensor configuration shown in FIG. 6. A sensor package 27 in one embodiment includes two distance measuring sensors and an optical flow camera. The distance measuring sensors, such as time-of-flight or lidar, determine the distance to a target surface 32 using beams 30 which are slightly angled outward. By comparing these measurements, the microcontroller 48 can determine both the distance and angle of the hybrid multirotor-cyclorotor drone 14 relative to the target surface 32. The optical flow camera compares images of an image region 31 of the target surface 32 and identifies vertical or sideways drift of the hybrid multirotor-cyclorotor drone 14 relative to the target surface 32. This sensor package 27 may also include a first-person view camera and transmitter so that an operator on the ground can precisely pilot the hybrid multirotor-cyclorotor drone 14 without being near the target surface 32. The sensor package 27 sends signals to the microcontroller 48.

The microcontroller 48 also receives signals 102 from a pilot via a remote hand controller or joystick. Alternatively, an on-board or off-board computer acting as an autopilot could feed navigational commands to the microcontroller 48 based on a pre-programmed route or in relation to on-board or off-board sensors. The microcontroller 48 implements feedback based on these signals to vary the multirotor torque 103 and the cyclorotor thrust vector 106. Altering the multirotor torque 103 alters the multirotor rotational speed 104, which in turn determines multirotor thrust 105. The cyclorotor thrust vector 106 is altered by way of the exact cyclorotor blade pitching and rotation mechanism implemented. This is specific to the type of blade pitching mechanism implemented. Increasing cyclorotor thrust increases the reaction torque of the cyclorotor on the drone 113.

Changing the multirotor torque 103 and cyclorotor torque 106 creates a net torque on the hybrid multirotor-cyclorotor drone 14 to control yaw 110. Differentially varying rotors thrust 105 controls drone pitch 107 and roll 108. Simultaneously varying rotors thrust 105 controls drone lift 109. Controlling the cyclorotor thrust 106 controls the drone side thrust 111 and drone forward thrust 112. The combination of the translational and rotational drone motions 107-112 constitutes a six DOF flight path of the drone 113.

Figure 7:
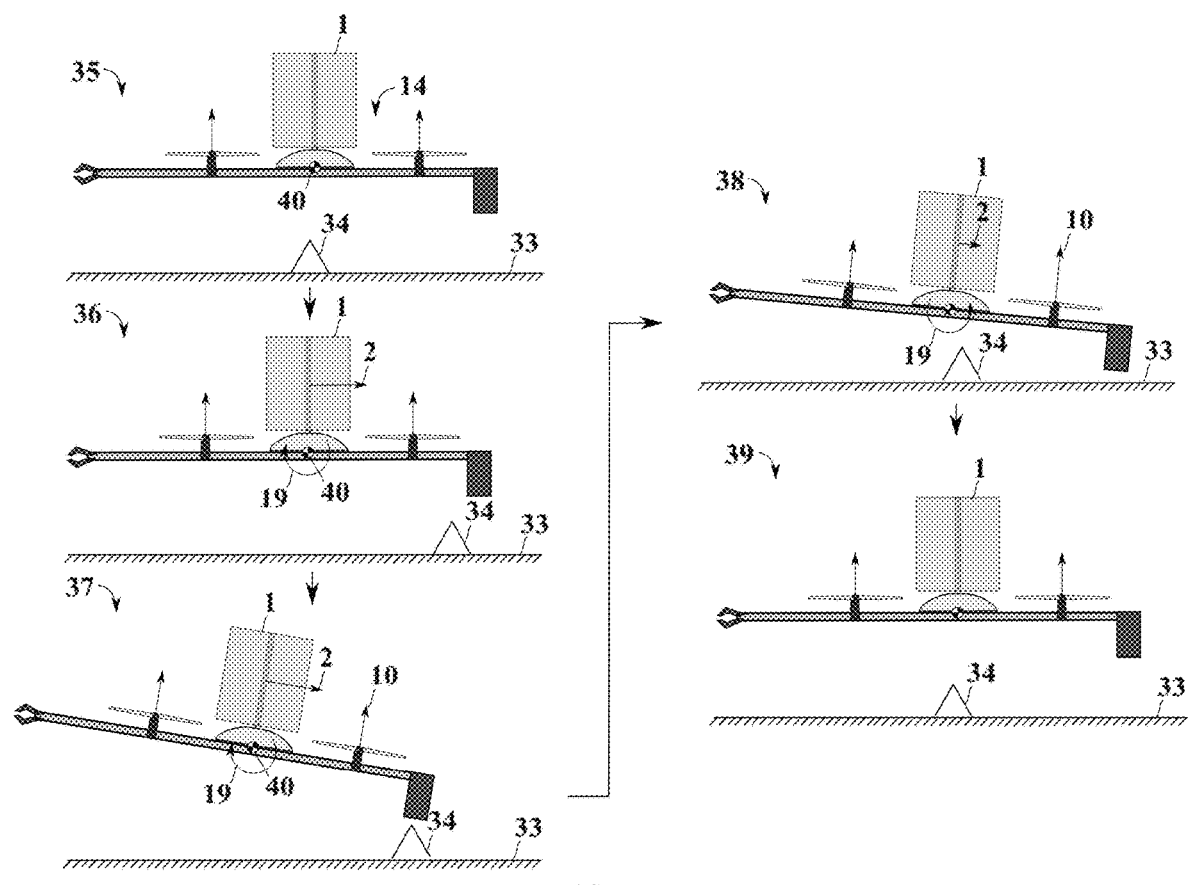
FIG. 7 shows how the invention resists lateral disturbances due to perturbations.

The method 100 provides the primary means of control and stability. An embodiment of the hybrid multirotor-cyclorotor drone 14 provides some inherent stability. FIG. 7 shows a series of events. Initially at hover 35, the hybrid multirotor-cyclorotor drone 14 is hovering above some stationary point 34 on the ground 33. Next at laterally perturbed 36, a perturbation induces a lateral motion away from that stationary point 34. Airflow through a cyclorotor without changing the blade pitch creates a net thrust 2 on the cyclorotor that opposes the motion. Since the cyclorotor is located above the hybrid multirotor-cyclorotor drone 14 center of gravity 40, the net cyclorotor thrust induces a pitch rotation 19. Next at pitched 37, the pitch rotation 19 pitches the hybrid multirotor-cyclorotor drone 14 back towards the original stationary point 34 over which it was hovering. This causes a component of the differential rotors thrust 10 to act to resist the motion away from the point on the ground. Next at restore pitch 38, the hybrid multirotor-cyclorotor drone 14 control system recognizes the displacement and restores a level pitch. Ultimately at restore hover state 39, the hybrid multirotor-cyclorotor drone 14 would fine tune the lateral position to return to hovering over the original stationary point 34 on the ground 33. This effect is similar to that caused by tilting multirotors inwards towards the center of multirotor drones. It is an aerodynamic stabilizing effect similar to wing dihedral, sweep, or vertical position on a fixed-wing aircraft.

Figure 8:
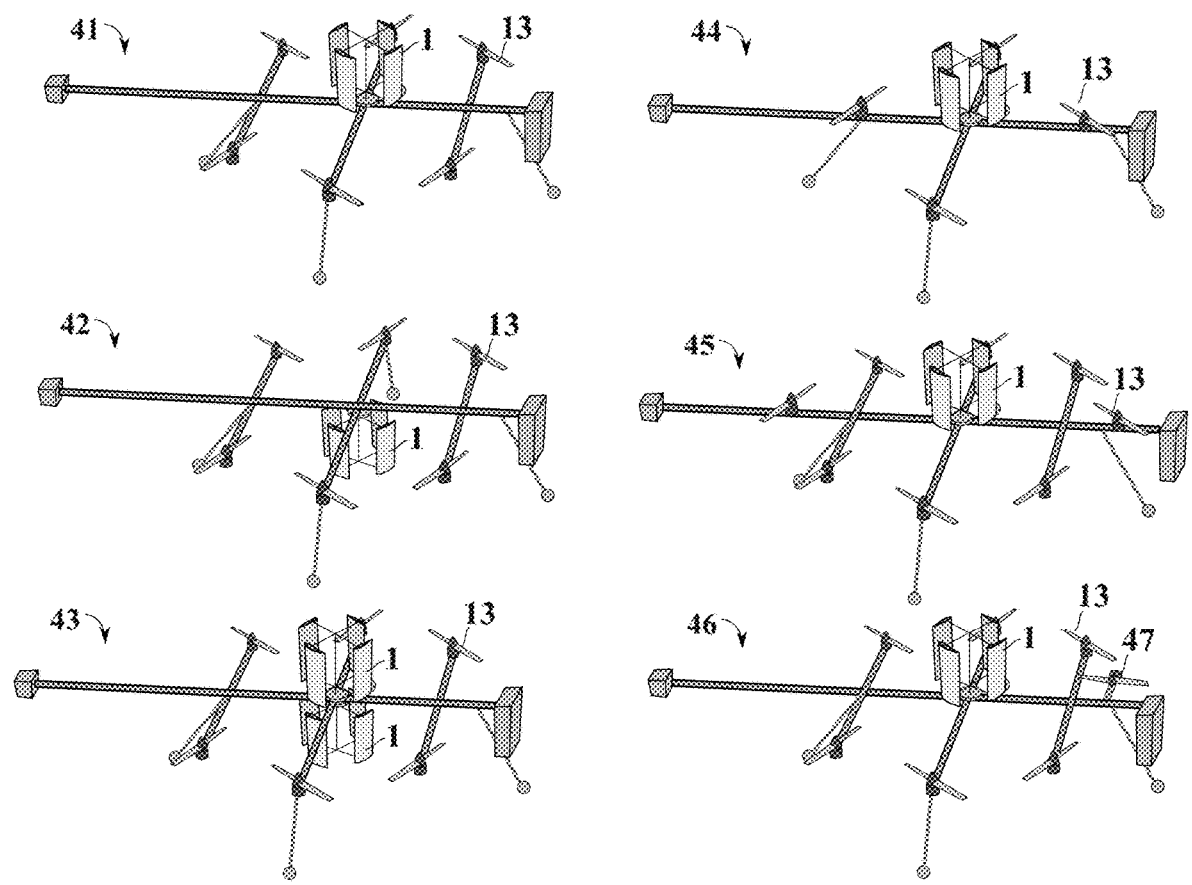
FIG. 8 shows several other embodiments of the invention.

FIG. 8 shows alternative embodiments of the invention. One embodiment 41 implements a cyclorotor 1 on top with six multirotors 49 for lift. In another embodiment 42, the cyclorotor 1 could also be placed below the longitudinal member 23, or two cyclorotors 1 could be implemented in embodiment 43 with one above and one below the longitudinal member 23. Moreover, the number of multirotors 49 could be varied. A quadrotor embodiment 44 and octo-rotor embodiment 45 are simple variations. In the embodiment shown for the hybrid multirotor-cyclorotor drone 14 the multirotor torque is used to counter the cyclorotor torque. However, in an alternative embodiment 46, an additional tail rotor 47 mounted on the longitudinal member 23 and displaced along the longitudinal axis 15 with a rotational axis along the lateral axis 16 could be included to directly counter cyclorotor torque. One skilled in the art will recognize that these different embodiments could be implemented separately or in combinations with each other.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications will suggest themselves without departing from the scope of the disclosed subject matter.

What is claimed is:

1. A method for controlling an aircraft, the method comprising the steps of:
   (a) receiving at least one of a plurality of control signals;
   (b) actuating by way of receiving step (a) a lateral thrust at or near perpendicular to a gravity vector of at least one cyclorotor oriented with an axis of rotation at or near parallel to the gravity vector, and a differential rotor thrust perpendicular to the lateral thrust of a plurality of multirotors; and
   (c) positioning by way of actuating step (b) the aircraft in a location in space.

2. The method according to claim 1 further comprising the steps of:
   providing a microcontroller for the aircraft;

reading by the microcontroller a plurality of signals received from a plurality of sources; and
sending by the microcontroller the plurality of control signals to at least one of:
the at least one cyclorotor; and
the plurality of multirotors.

3. The method according to claim 2 further comprising the steps of:
attaching a sensor package to the aircraft to have a necessary field of view as required by the sensor package; and
sending by the sensor package a plurality of sensor signals to the microcontroller.

4. The method according to claim 3 further comprising the step of:
equipping the sensor package with at least one of:
at least two distance measuring sensors;
an optical flow camera; and
a first-person view camera and transmitter.

5. The method according to claim 3 wherein the reading step further comprises at least one of the steps of:
reading the plurality of sensor signals;
reading a first signal indicating a state of the plurality of multirotors;
reading a second signal indicating a state of the at least one cyclorotor;
reading a third signal from a gyroscope;
reading a fourth signal from an accelerometer;
reading a fifth signal from an environmental sensor;
reading a sixth signal from a horizontally oriented range finding sensor to determine a range from a target surface;
reading a seventh signal from an optical flow camera to determine a lateral motion of the aircraft and a vertical motion of the aircraft relative to the target surface;
reading an eighth signal from a global positioning system;
reading a ninth signal from a pilot; and
reading a tenth signal from an autopilot.

6. The method according to claim 5 further comprising the step of:
maneuvering the aircraft near the target surface; and
inspecting the target surface with a payload attached to the aircraft.

7. The method according to claim 6 further comprising the step of:
equipping the payload with at least one of:
a touch-based non-destructive testing sensor;
a drill;
a robotic arm;
an active thermography sensor;
a ground penetrating radar;
a Schmitt hammer;
a thermal camera;
an optical camera;
a microscope;
a paint spray-gun;
a nail gun;
a vacuum;
a pressure washer;
a welder;
a rotary saw; and
a chain saw.

8. The method according to claim 1 wherein the positioning step (c) further comprises at least one of the steps of:
varying the thrust of the at least one cyclorotor to adjust a lateral motion of the aircraft;
varying a torque of the at least one cyclorotor and varying a torque of the plurality of multirotors in combination to adjust a yaw of the aircraft; and
varying the thrust of the plurality of multirotors to adjust at least one of a pitch of the aircraft, a roll of the aircraft, and a vertical orientation of the aircraft.

9. An aircraft comprising:
a plurality of multirotors whose axis of rotation is oriented at or near vertical;
at least one cyclorotor whose axis of rotation is oriented at or near vertical for providing a thrust for a lateral control of the aircraft;
a payload; and
a frame for connecting the plurality of multirotors, the at least one cyclorotor, and the payload.

10. The aircraft according to claim 9 further comprising:
a microcontroller located on the frame that reads a plurality of signals from a plurality of sources, and sends a plurality of control signals to at least one of:
the plurality of multirotors; and
the at least one cyclorotor.

11. The aircraft according to claim 10 wherein the plurality of signals from the plurality of sources are selected from the group consisting of:
a first signal indicating a state of the plurality of multirotors;
a second signal indicating a state of the at least one cyclorotor;
a third signal from a gyroscope;
a fourth signal from an accelerometer;
a fifth signal from an environmental sensor;
a sixth signal from a horizontally oriented range finding sensor to determine a range from a target surface;
a seventh signal from an optical flow camera to determine a lateral motion of the aircraft and a vertical motion of the aircraft relative to a target surface;
an eighth signal from a global positioning system;
a ninth signal from a pilot; and
and a tenth signal from an autopilot.

12. The aircraft according to claim 9 further comprising:
a thrust from the at least one cyclorotor used to actuate lateral control; and
a thrust from the plurality of multirotors used to oppose gravity.

13. The aircraft according to claim 9 further comprising:
a longitudinal member;
a payload mounted at a first end of the longitudinal member;
a battery mounted at a second end of the longitudinal member; and
a plurality of lateral support members that extend outward from the longitudinal member;
wherein the plurality of multirotors are mounted on the lateral support members, and the cyclorotor is mounted on the longitudinal member.

14. The aircraft according to claim 13 further comprising:
a sensor package mounted on the longitudinal member, the sensor package further comprising at least one of:
at least two distance measuring sensors;
an optical flow camera; and
a first-person view camera and transmitter.

15. The aircraft according to claim 13 wherein the payload further comprises at least one of:
a touch-based non-destructive testing sensor;
a drill;

a robotic arm;
a touch-based non-destructive testing sensor;
a drill;
an active thermography sensor;
a ground penetrating radar;
a Schmitt hammer;
a thermal camera;
an optical camera;
a microscope;
a paint spray-gun;
a nail gun;
a vacuum;
a pressure washer;
a welder;
a rotary saw; and
a chain saw.

16. The aircraft according to claim 9 further comprising:
a tail rotor mounted on the longitudinal member.

17. An aircraft comprising:
a longitudinal member;
a payload mounted at a first end of the longitudinal member;
a battery mounted at a second end of the longitudinal member;
a combined center of gravity of the payload and the battery that is laterally and longitudinally coincident with a center of gravity of the aircraft;
a plurality of lateral support members that extend outward from the longitudinal member;
a plurality of multirotors, each of which is located at an outer end of each of the plurality of lateral support members; and
at least one cyclorotor mounted on the longitudinal member between the payload and the battery.

18. The aircraft according to claim 17 further comprising:
a net center of gravity located at or near the center of the aircraft;
wherein the payload is designed to be positioned close to or in contact with another object.

19. The aircraft according to claim 17 wherein the payload is designed to have a clear field of observation by positioning the payload at the first end of the longitudinal member and forward of the plurality of multirotors.

20. The aircraft according to claim 17 further comprising:
a sensor package mounted on the longitudinal member, the sensor package further comprising at least one of:
at least two distance measuring sensors;
an optical flow camera; and
a first-person view camera and transmitter.

* * * * *